United States Patent [19]

Bormann et al.

[11] Patent Number: 4,869,307

[45] Date of Patent: Sep. 26, 1989

[54] PNEUMATIC TIRE AND METHOD FOR MAKING SAME

[75] Inventors: René L. Bormann, Moesdorf; Antonnis G. Maathuis, Fouhren; Jürgen Spielmann, Heisdorf; Theo Meijer, Luxembourg, all of Luxembourg; Klaus Beer, Stow; Thomas R. Oare, Suffield, both of Ohio

[73] Assignee: The Goodyear Tire & Rubber Company, Akron, Ohio

[21] Appl. No.: 169,561

[22] Filed: Mar. 17, 1988

[51] Int. Cl.⁴ .................. B60C 9/20; B29D 30/38
[52] U.S. Cl. ..................................... 152/533; 152/534; 152/536; 152/538; 156/117; 156/130
[58] Field of Search ............... 152/531, 533, 535, 536, 152/534, 538; 156/117, 130

[56] References Cited

U.S. PATENT DOCUMENTS

| | | | |
|---|---|---|---|
| 2,826,233 | 3/1958 | Cooper | 152/536 X |
| 2,958,359 | 11/1960 | Boussu et al. | 152/535 X |
| 3,130,769 | 4/1964 | Hindin et al. | 152/209 R |
| 3,503,432 | 3/1970 | Maiocchi | 152/176 |
| 3,607,497 | 9/1971 | Chrobak | 156/95 |
| 3,746,590 | 7/1973 | Bartley et al. | 156/117 |
| 3,900,062 | 8/1975 | Neville et al. | 152/527 |
| 3,979,536 | 9/1976 | Neville et al. | 428/43 |
| 3,990,493 | 11/1976 | Caretta | 152/526 |
| 3,991,803 | 11/1976 | Praszek | 156/117 X |
| 4,094,354 | 6/1978 | Ferrell et al. | 152/531 |
| 4,098,315 | 7/1978 | Ferrell et al. | 152/531 |
| 4,135,565 | 1/1979 | van der Burg | 152/527 |
| 4,140,168 | 2/1979 | Caretta | 152/527 |
| 4,201,260 | 5/1980 | Mirtain et al. | 152/531 |
| 4,202,394 | 5/1980 | van der Burg | 152/531 |
| 4,484,965 | 11/1984 | Wagner et al. | 156/117 |

FOREIGN PATENT DOCUMENTS

| | | | |
|---|---|---|---|
| 0258822 | 3/1988 | European Pat. Off. | |
| 1275766 | 8/1968 | Fed. Rep. of Germany | 156/117 |
| 3606934 | 10/1987 | Fed. Rep. of Germany | |
| 2285255 | 4/1976 | France | |
| 62-203803 | 9/1987 | Japan | |
| 62-225406 | 10/1987 | Japan | |
| 62-251202 | 11/1987 | Japan | |
| 62-251203 | 11/1987 | Japan | |
| 85964 | 1/1986 | Luxembourg | |
| 1487426 | 9/1977 | United Kingdom | 152/533 |
| 1581571 | 12/1980 | United Kingdom | |

Primary Examiner—Raymond Hoch
Attorney, Agent, or Firm—L. R. Drayer

[57] ABSTRACT

A pneumatic tire (1) comprises a radial carcass (2), a tread portion (7) and a belt reinforcing structure (8) extending circumferentially around the carcass (2). Disposed radially outwardly of the belt reinforcing structure (8) is a textile reinforced overlay structure (9) having substantially circumferentially extending cords (10). The overlay structure (9) is composed of a series of helical convolutions of a textile ribbon (11) whereby adjacent helical convolutions of the textile ribbon (11) overlap. There is further disclosed a method of applying multiple layers of a single continuous helically wound textile ribbon (11) in a single continuous operation from one axial side to the other axial side of the belt reinforcing structure (8).

19 Claims, 4 Drawing Sheets

PNEUMATIC TIRE AND METHOD FOR MAKING SAME

This invention relates generally to pneumatic tires and more specifically to tires having a textile reinforced overlay structure located radially outwardly of a belt reinforcing structure.

Such a tire is for example described in LU-85 964. In this prior art patent helical convolutions of a ribbon are wound axially across the belt reinforcing structure such that the convolutions are in abutting contact with each other. Although in practice tires using this construction have exhibited the benefits claimed in LU 85 964, there are a number of restrictions that the construction of this prior art tire imposes onto the manufacturing methods. There is disclosed herein a tire which can be manufactured more economically and using more flexible building methods. The invention is characterized in that adjacent helical convolutions of the ribbon overlap. Preferably adjacent helical convolutions of the ribbon overlap such that the width of the overlap is greater in the axially outer portions than in the center portion of the overlay structure.

The present invention also relates to a method of manufacturing a radial tire in which a textile reinforced overlay structure is placed around the radially outer periphery of a belt reinforcing structure by helically winding of a continuous ribbon of elastomeric material, reinforced by longitudinally extending cords, from one axial side to the other axial side of the belt reinforcing structure. Such a method is also described in the aforementioned LU-85 964. The method as described in this prior art reference has the drawback that if it is desired to form an overlay structure with two or more layers of the ribbon, two or more complete helical convolutions have to be applied from one axial side of the reinforcing belt structure to the other axial side. This involves a multiple step operation, which considerably slows down the manufacturing process.

There is provided in accordance with one aspect of the invention a pneumatic tire comprising a radial carcass, a tread portion and a belt reinforcing structure which is radially interposed between the carcass and the tread portion, a textile reinforced overlay structure being located radially outwardly of the belt reinforcing structure, the overlay structure comprising a series of helical convolutions of a ribbon which comprises an elastomeric material reinforced by cords arranged side-by-side and extending longitudinally of the ribbon with adjacent turns of the ribbon being in an overlapping relationship.

There is provided with another aspect of the invention a method of manufacturing a radial tire comprising the step of placing a textile reinforced overlay structure around the radially outer periphery of a belt reinforcing structure by helically winding a textile ribbon from one axial side to the other axial side of the belt reinforcing structure while applying each spiral convolution of the textile ribbon in overlapping relationship with its respective adjacent spiral convolutions.

The invention will now be described with reference to the accompanying drawings in which.

The terms "axial" and "axially" as used throughout this specification refer to directions parallel to the axis of rotation of a tire. The terms "radial" and "radially" as used throughout this specification refer to directions perpendicular to the axis of rotation of a tire.

Figure 1:
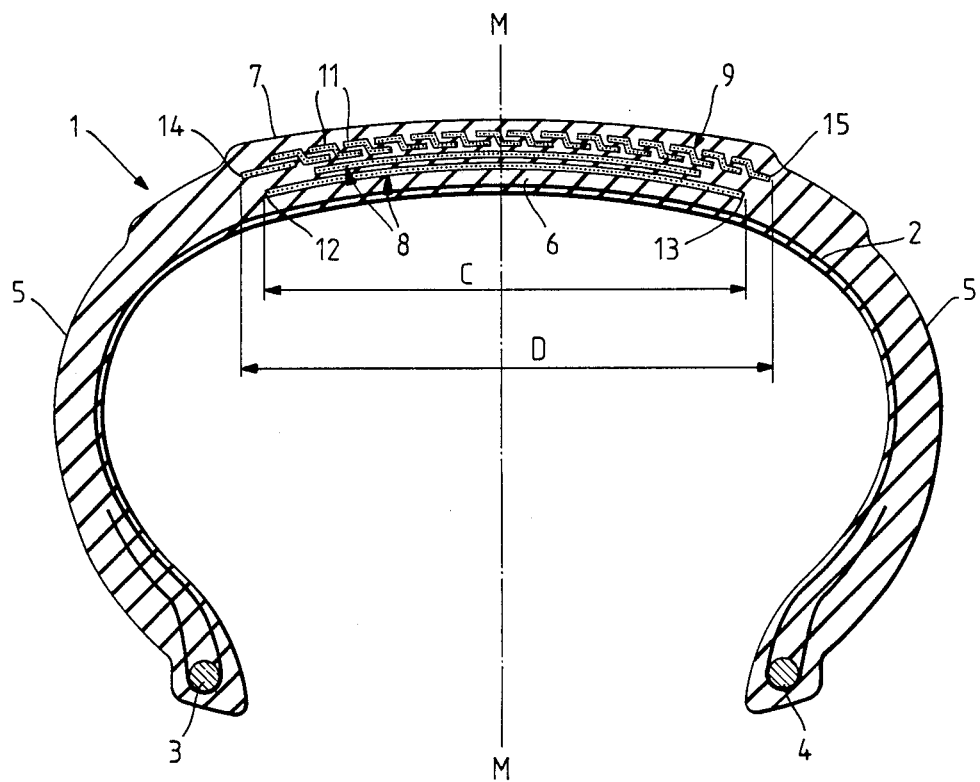
FIG. 1 is a cross-sectional view of a pneumatic tire according to this invention.

With reference to FIG. 1 there is illustrated a cross-sectional view of a pneumatic tire 1 having a radial carcass. A radial carcass ply 2 extends between a pair of annular beads 3,4. A sidewall 5 extends radially outwardly from each bead 3,4 to a crown region 6 of the tire. The crown region 6 has a ground contacting tread 7 extending circumferentially thereabout. The tire is reinforced in the crown region by an annular belt reinforcing structure 8 disposed radially outwardly of the carcass ply 2. The belt reinforcing structure 8 comprises one or more elastomeric plies 12,13 reinforced by steel cord or an other known suitable material, for example glass fiber, or aromatic polyamide.

Radially outwardly of the belt reinforcing structure 8 there is disposed a textile reinforced overlay structure 9 having an axial width D between its lateral edges 14,15 such that it is at least as wide as the axial width C of the belt reinforcing structure 8 so as to completely cover it.

Figure 2:
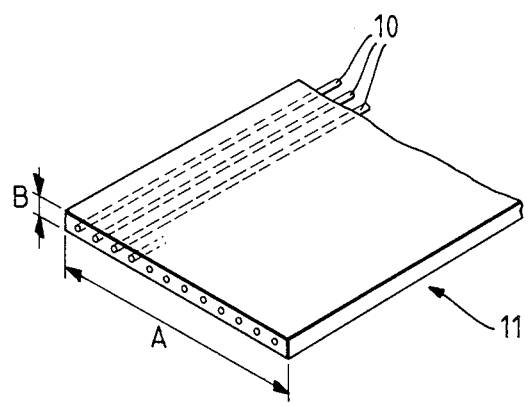
FIG. 2 is a schematic view of the ribbon utilized for the construction of the overlay structure.

As can be seen from FIG. 1 and FIG. 2, the overlay structure 9 comprises a helically wound ribbon 11, of elastomeric material having longitudinally extending cords 10 embedded therein, which extend circumferentially around the tire and substantially parallel with the mid-circumferential plane M—M of the tire, that is, they make an angle of between 0°-5° with the mid-circumferential plane M—M.

By "mid-circumferential plane" is meant a plane which is perpendicular to the axis of rotation of the tire and which is located midway between the beads 3,4.

Adjacent helical convolutions of the ribbon 11 overlap. The ribbon has a width A, preferably in the range of 10 to 40 mm, and a thickness B, preferably in the range of 0.4 to 1.2 mm. Preferably the cords 10 of the ribbon 11 are made of a heat shrinkable material such as nylon.

Figure 3:
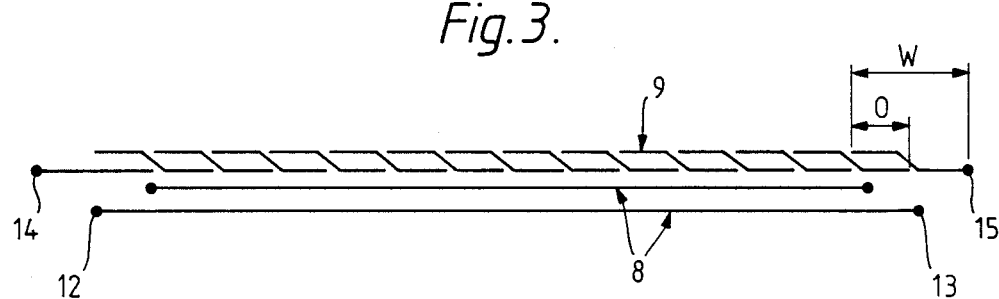
FIG. 3 is a schematic cross sectional view of the construction of the overlay structure as applied on a belt reinforcing structure of a first embodiment of the invention.

In FIG. 3 there is schematically illustrated a cross section of an embodiment in which the overlay structure 9 comprises adjacent overlapping convolutions of the ribbon 11 disposed radially outwardly of the belt structure 8. In the embodiment shown here, and throughout this specification, the belt structure that is illustrated comprises two plies 12,13 with reinforcing cords making opposite angles with the mid-circumferential plane M—M of the tire. It is understood that the present invention is not limited thereto, but equally applies to tires having different belt structures. As can be seen from FIG. 3, the adjacent convolutions of the ribbon 11 overlap. The width of the overlap between adjacent turns of the ribbon is indicated by an axial distance O. In the embodiment shown in FIG. 3, the ribbon overlap is such that the axial width O of the overlap is uniform across the width of the belt reinforcing structure. The uniform axial width O of the overlap is determined by the following equation:

$$O = W\left(1 - \frac{1}{n}\right)$$

whereby:
O=axial width of the overlap between adjacent turns of the ribbon
W=width of the ribbon
n=integer which represents the number of desired layers of the ribbon in the overlay structure.

The number of desired layers of the ribbon 11 determines the axial width of the overlap O between adjacent turns of the ribbon 11.

Figure 4:
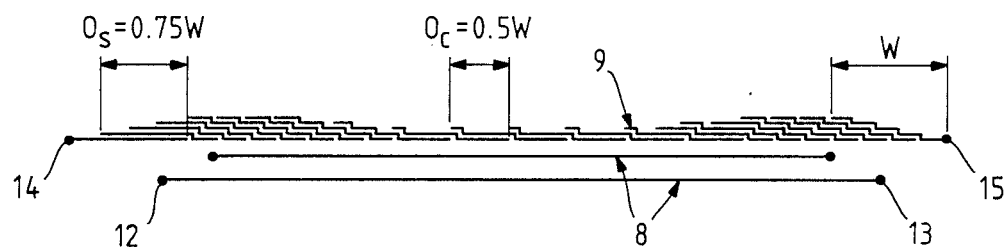
FIG. 4 is a schematic cross sectional view of the construction of the overlay structure as applied on a belt reinforcing structure of a second embodiment of the invention.

FIG. 4 shows an example of a preferred embodiment in which the overlay structure 9 is divided into a center portion and a pair of axially outer portions. By center portion of the overlay structure 9 is meant the portion of the overlay structure 9 that extends axially outwardly on either side of the mid-circumferential plane M—M over about 25% of the width of the overlay structure 9, and by axially outer portions are meant the portions on either side of the center portion which extend axially inwardly from the axial edges 14,15 of the overlay structure 9 over about 25% of the width of the overlay structure 9. According to FIG. 4, the overlap between adjacent helical convolutions of the ribbon 11 is such that the width O of the overlap is not constant across the width of the overlay structure 9 but is greater in the axially outer portions than in the center portion of the overlay structure 9. In the embodiment shown in FIG. 4, the axial width of the overlap $O_S$ between adjacent turns of the ribbon in the axially outer portions of the overlay structure 9 is 0.75 times the width W of the ribbon, while the axial width of the overlap $O_C$ between adjacent turns of the ribbon in the center portion of the overlay structure 9 is 0.5 times the width W of the ribbon.

The greater axial width of the overlap between adjacent helical convolutions of the ribbon 11 in the axially outer portions of the overlay structure 9 results in a greater density of cords in this area of the tire and hence, confers a greater strength to these areas. This may be desirable for counteracting the stresses which the tire experiences during service and which are most concentrated in its shoulder portions.

Figure 5:
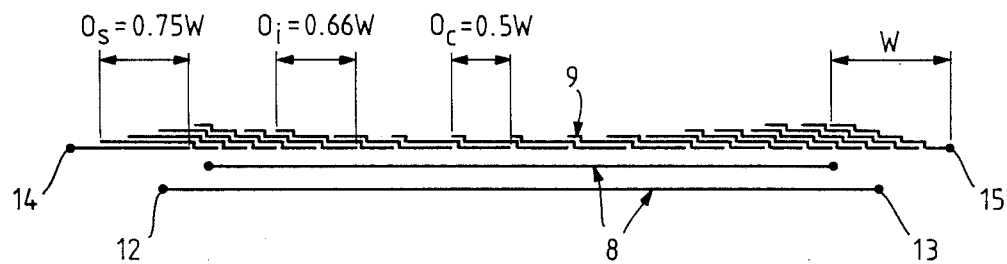
FIG. 5 is a schematic cross sectional view of a construction of the overlay structure as applied on a belt reinforcing structure of a third embodiment of the invention.

In a further preferred embodiment of the invention, illustrated in FIG. 5, the adjacent helical convolutions of the ribbon are arranged such that the width O of the overlap decreases continuously from each axial edge 14,15 of the overlay structure 9 towards the center of the overlay structure 9.

In the embodiment shown in FIG. 5, the axial width of the overlap O between adjacent turns of the ribbon decreases gradually from 0.75 times ($O_S$) the width W of the ribbon in the axially outer portions to 0.5 times ($O_C$) the width W of the ribbon in the center portion of the overlay structure 9, while there is also shown an intermediate value $O_i$ of the overlap between adjacent turns of the ribbon which are located between the axially outer portions and the center portion of the overlay structure 9, $O_i$ being 0.66 times the width W of the ribbon.

Figure 6:
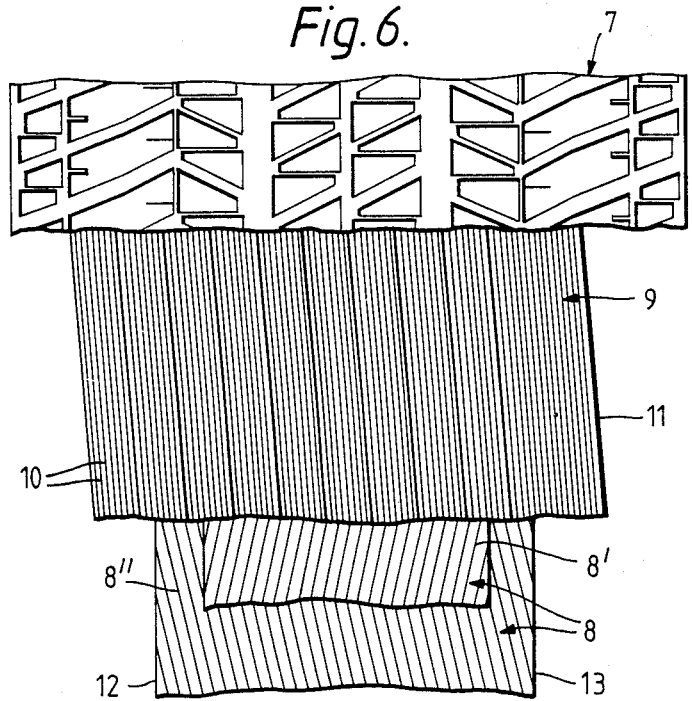
FIG. 6 is a partially schematic view of a two ply belt reinforcing structure in conjunction with an overlay structure and a tread portion.

With reference to FIG. 6 there is provided a schematic view of a two ply belt reinforcing structure 8 in conjunction with an overlay structure 9 and a tread portion 7. As can be seen from this Figure, the first and the last convolution of the ribbon begin and finish at an axial distance beyond each axial edge 12, 13 of the belt reinforcing structure 8, the axial distance being at least equal to the width of the overlap as measured at the axial edges 12, 13 of the belt reinforcing structure 8. Such an arrangement of the ribbon 11 ensures that the entire belt reinforcing structure 8 is covered by the helically wound convolutions of the ribbon 11. The excess material of the overlay structure 9 beyond the axial edges 12, 13 of the belt reinforcing structure may be trimmed back to the axial edges 12,13 if it is so desired.

Figure 7:
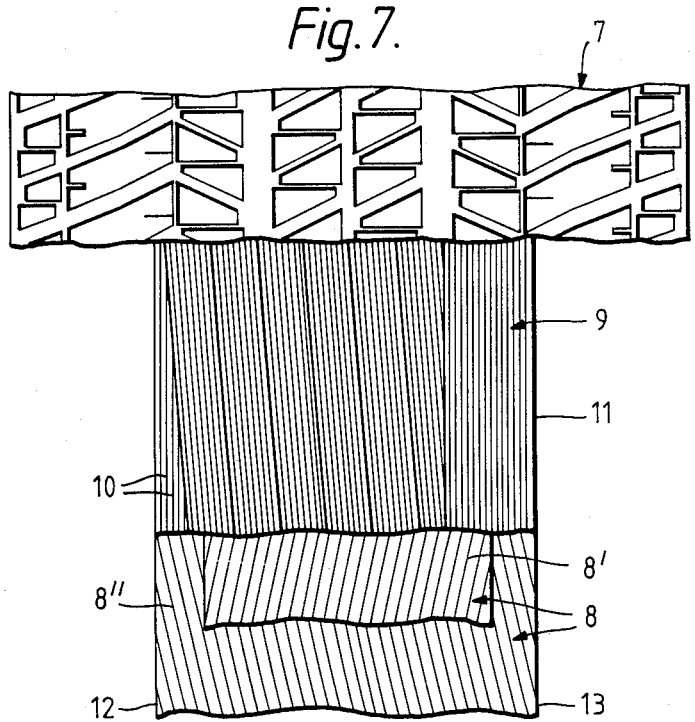
FIG. 7 is another partially schematic view of a two ply belt reinforcing structure in conjunction with an overlay structure and a tread portion.

Alternatively, as illustrated in FIG. 7, the axially outer edges of the first and the last convolutions of the ribbon 11 can be arranged such that they coincide with the axially outer edges 12,13 of the belt reinforcing structure 8 and that they are substantially parallel to the mid-circumferential plane of the tire, while the other convolutions of the ribbon 11 are all helically wound. This particular construction has the advantage that the axial width of the overlay structure 9 is identical to the axial width of the belt reinforcing structure 8 and that no trimming of the normally obtained excess material at the axial edges 12,13 of the belt reinforcing structure is required.

As can be seen further from both FIG. 6 and FIG. 7, the overlay structure 9 is preferably applied such that the cords 10 of the overlay structure 9 are in a crossing relationship with the cords 8″ of the radially outermost belt layer 8′ of the belt reinforcing structure 8, i.e. are oriented in a direction opposite to the direction of the cords 8″ of the radially outermost belt layer 8′. This crossing relationship of the cords helps towards reducing the tendency of the tire steering in a particular direction which tendency is commonly known in the tire art as ply steer.

However, the present invention is not limited to this crossing relationship between the cords 10 of the overlay structure 9 and the cords 8″ of the radially outermost belt layer 8′, but is equally applicable to an overlay structure 9 where the cords 10 are positioned such that they are in a parallel relationship with the cords 8″ of the radially outermost belt layer 8′ of the belt reinforcing structure 8.

There are two alternative methods generally used for applying the overlay structure to the belt reinforcing structure. A first method comprises assembling the overlay structure around the belt reinforcing structure on a separate drum before the total belt assembly is applied on the carcass band, the belt reinforcing structure thus being built on a separate drum. A second method comprises assembling a tire whereby the overlay structure is assembled around the belt reinforcing structure during the final step of the tire building process, that is after that the belt reinforcing structure has been assembled around a toroidal tire casing.

Figure 8:
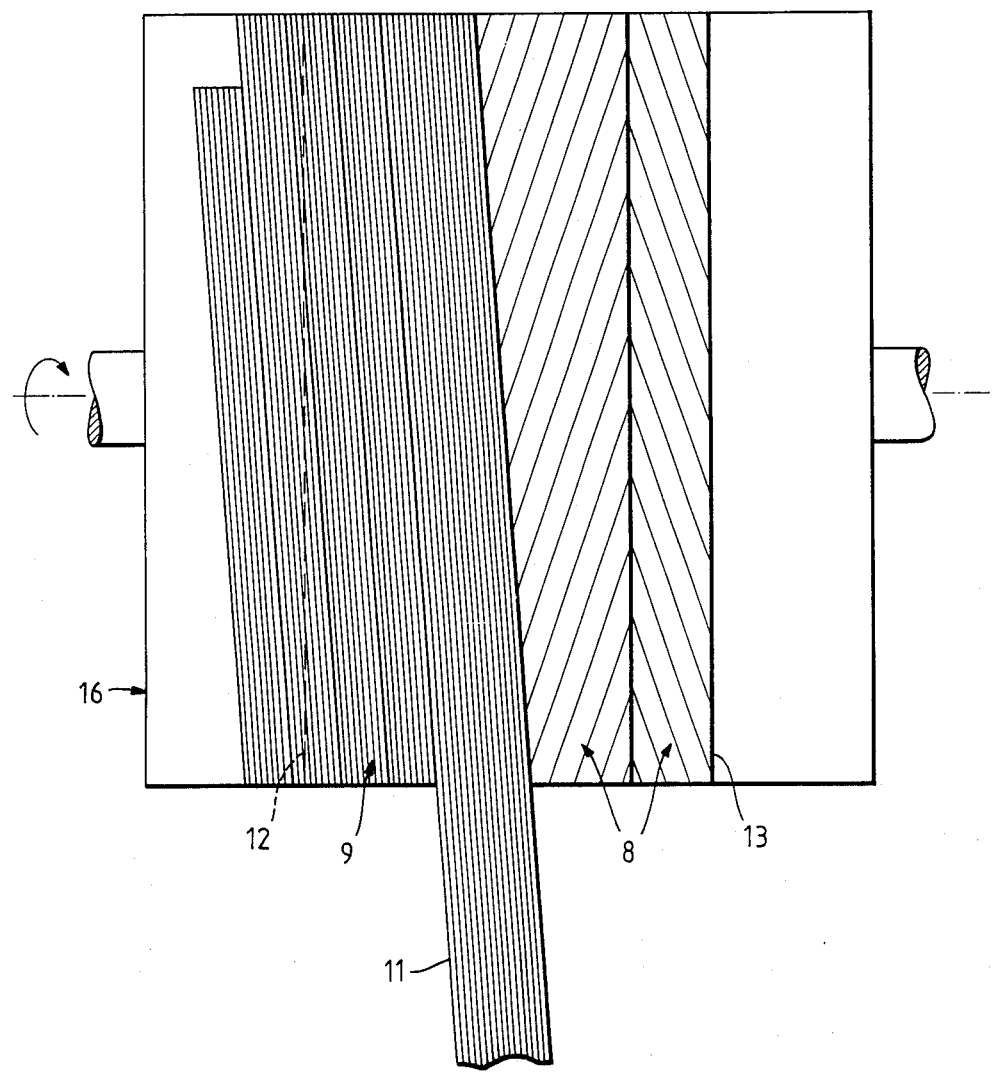
FIG. 8 is a schematic view illustrating a method for applying an overlay structure on a belt reinforcing structure which is located on a tire building drum.

FIG. 8 schematically illustrates the method for assembling a tire according to the present invention that can be used with either of the methods described above. In FIG. 8, there is illustrated a drum 16 upon which there is placed a belt reinforcing structure 8. In the case of the second method as explained above, the drum would be replaced by a toroidal tire casing. The overlay structure 9 is placed around the belt reinforcing structure 8 by helically winding a single continuous ribbon 11 of cord reinforced elastomer around the outside of the belt reinforcing structure 8 from one axial edge 12 thereof to the other axial edge 13 thereof. In the embodiments shown, the ribbon 11 is wound in one continuous operation from the left hand axial edge 12 of the belt reinforcing structure 8 to its right hand edge 13, but could alternatively be wound in the other direction. The ribbon 11 is wound such that each helical convolution is in overlapping relationship with its respective adjacent helical convolutions.

In a preferred embodiment of a tire according to the invention, as shown in FIG. 3, adjacent convolutions of the ribbon 11 are applied in such a way that the axial width of the overlap between adjacent convolutions is uniform across the width of the belt reinforcing structure 8. The uniform width of the overlap is determined by the equation described above in conjunction with the pneumatic tire of the present invention.

The method of the present invention equally applies to the manufacture of the other preferred embodiments of the pneumatic tires as described above and illustrated in FIGS. 4, 5, 6 and 7.

While certain representative details and embodiments have been shown and described for the purpose of illustrating the invention, it will be apparent to those skilled in the tire art that various changes and modifications may be made therein without departing from the spirit or the scope of the invention.

We claim:

1. A pneumatic tire comprising a radial carcass, a tread portion and a belt reinforcing structure comprising steel cords which has a pair of axial edges and is radially interposed between the carcass and the tread portion, a textile reinforced overlay structure being radially interposed between the belt reinforcing structure and the tread portion, the overlay structure comprising a single continuous ribbon helically wound about the belt reinforcing structure and extending between the axial edges of the belt reinforcing structure, said ribbon comprises an elastomeric material reinforced by cords of a heat shrinkable material arranged side by side and extending longitudinally of the ribbon with adjacent turns of the ribbon being in an overlapping relationship, said ribbon and cords being disposed at 0° to 5° with respect to a mid-circumferential plane of the tire, the cords of the overlay structure being oriented in a direction opposite to the direction of the steel cords of a radially outermost belt layer of the belt reinforcing structure such that the cords of the overlay structure are in a crossing relationship with the steel cords of the radially outermost belt layer of the belt reinforcing structure, and said overlay structure comprising a center portion and a pair of axially outer portions with the width of the overlap of adjacent turns of aid ribbon being greater in the axially outer portion than in the center portion.

2. A pneumatic tire as claimed in claim 1, wherein the overlay structure has a pair of axial edges and the axial width of the overlap decreases gradually from each axial edge of the overlay structure to the center portion of the overlay structure.

3. A pneumatic tire as claimed in either claim 1 or 5 wherein the axial width of the overlay structure is equal to the axial width of the belt reinforcing structure.

4. A pneumatic tire as claimed in either claim 1 or 5 wherein the axial width of the overlay is greater than the axial width of the belt reinforcing structure.

5. A pneumatic tire as claimed in either claim 1 or 5 wherein the width of the ribbon is in the range of 10 to 40 mm.

6. A pneumatic tire as claimed in either cliam 1 or 5 wherein the thickness of the ribbon is in the range of 0.4 to 1.2 mm.

7. A pneumatic tire as claimed in claim 5 wherein the thickness of the ribbon is in the range of 0.4 to 1.2 mm.

8. A pneumatic tire as claimed in either claim 1 or 2 wherein the reinforcing cords of the ribbon comprise a material selected from the group consisting of nylon and polyester.

9. A pneumatic tire as claimed in claim 1 wherein the axial width of the overlap between adjacent turns of the ribbon in the axially outer portions of the overlay structure is about 0.75 times the width of the ribbon while the axial width of the overlap between adjacent turns of the ribbon in the center portion of the overlay structure is about 0.5 times the width of the ribbon.

10. A pneumatic tire as claimed in either claim 1 or 9 wherein the center portion of the overlay structure extents axially outwardly on each side of the mid-circumferential plane of the tire over each 25% of the width of the overlay structure and the axially outer portions extend axially inwardly from the axial edges of the overall structure over about 25% of the width of the overlay structure.

11. A pneumatic tire as claimed in claim 2 wherein the axial width of the overlap between adjacent turns of the ribbon decreases gradually from about 0.75 times the width of the ribbon in the axially outer portions of the overlay structure to about 0.5 times the width of the ribbon in the center portion of the overlay structure.

12. A method of manufacturing a radial tire comprising the step of placing a textile reinforced overlay structure around the radial outer periphery of a belt reinforcing structure by helically winding an elastomeric ribbon, which is reinforced by cords of a heat shrinkable material arranged side by side and extending longitudinally of the ribbon, from one axial side to the other axial side of the belt reinforcing structure while applying each spiral convolution of the ribbon in overlapping relationship with its respective adjacent spiral convolutions in such a way that the ribbons and cords are disposed at 0° to 5° with respect to a mid-circumferential plane of the tire and the cords of the overlay structure being oriented in a direction opposite to the direction of the steel cords of a radially outermost belt layer of the belt reinforcing structure such that the cords of the overlay structure are in a crossing relationship with the steel cords of the radially outermost belt layer of the belt reinforcing structure, and the axial width of the overlay between adjacent convolutions of the ribbon is greater in axially outer portions of the overlay structure than in a center portion of the overlay structure.

13. A method as claimed in claim 12 wherein adjacent spiral convolutions of the ribbon are applied in such a way that the axial width of the overlap between adjacent convolutions of the ribbon decreases gradually from each axial edge of the overlay structure to the center portion of the overlay structure.

14. A method as claimed in claim 12 or 13 wherein the first and the last convolutions of the ribbon begin and finish at an axial distance beyond each axial edge of the belt reinforcing structure, the axial distance being at least equal to the width of the overlap, measured at the axial edges of the belt reinforcing structure.

15. A method as claimed in claim 12 or 13 wherein the axially outer edges of or the last convolutions of the ribbon coincide with the axially outer edges of the belt reinforcing structure.

16. A method as claimed in claim 12 to 13 wherein the convolutions of the ribbon are applied such that the first and the last convolution of the ribbon are substantially parallel to the mid-circumferential plane of the tire.

17. A method as claimed claim 12 to 13 wherein the ribbon has a width in the range of 10 to 40 mm.

18. A method as claimed in claim 12 to 13 wherein the ribbon has a thickness in the range of 0.4 to 1.2 mm.

19. A method as claimed in claim 17 wherein the ribbon has a thickness in the range of 0.4 to 1.2 mm.

* * * * *